Dec. 18, 1934.   A. J. DESIMONE   1,984,401
SUSPENSION LOOP FOR FLASH LIGHTS
Filed July 14, 1933
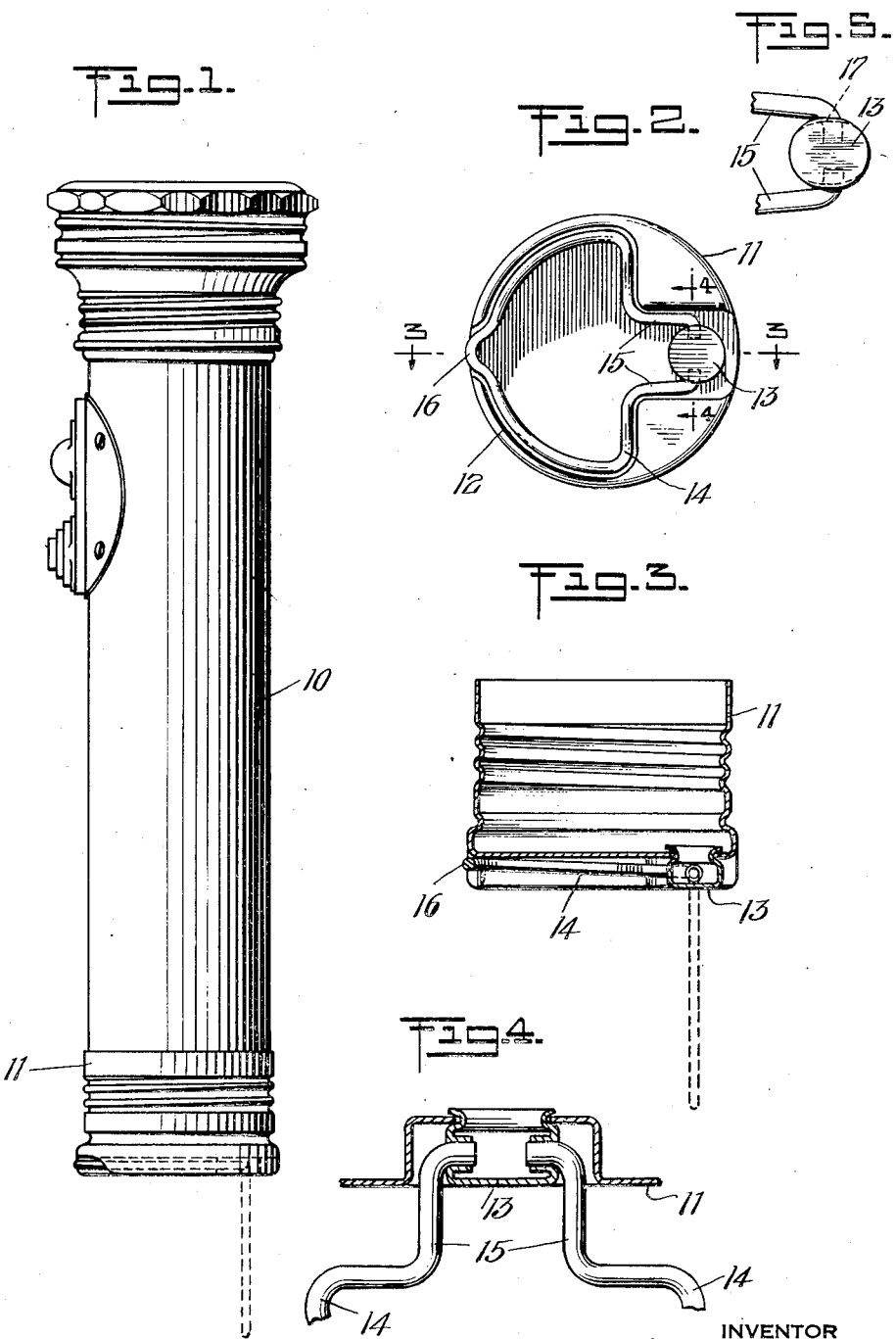
INVENTOR
Anthony J. Desimone
BY
Kenyon & Kenyon
ATTORNEYS.

Patented Dec. 18, 1934

1,984,401

UNITED STATES PATENT OFFICE 1,984,401

SUSPENSION LOOP FOR FLASH LIGHTS

Anthony J. Desimone, Lyndhurst, N. J., assignor to Bright Star Battery Company, Hoboken, N. J., a corporation of New York Application July 14, 1933, Serial No. 680,336

2 Claims. (Cl. 240—10.66)

This invention relates to portable electric lamps of the type known as flashlights. Such devices usually comprise a tubular casing closed at one end with a cap containing a lens, reflector and bulb and at the other end with a base cap having means for engaging a battery contained within the casing to hold it in engagement with the contact terminal of the bulb. The base caps usually are threaded on to the end of the casing and the invention relates more especially to such base cap.

An object of this invention is the provision in combination with the cap of an improved suspension loop by means of which the flashlight may be readily suspended from a support and which is contained within the surface of the cap when in inoperative position so as to permit standing the flashlight upright on the base cap.

According to the invention, a recess is formed in the base cap of sufficient depth to receive the suspension loop wholly below the surface of the cap. The suspension loop is pivoted to a stud rotatably attached to the base cap and having provision for impositively holding the suspension loop in the recess. The recess is of slightly larger dimensions than the suspension loop so that the latter fits loosely in the depression, the connection between the suspension loop and the rotatable stud being solely relied upon for holding the suspension loop in inoperative position. When it is desired to make use of the suspension loop, it is rotated about its pivot to a position at right angles to the surface of the cap and its relation to the cap while in this position may be varied by rotation of the stud to adapt the suspension loop to different positions, thus increasing the convenience of the loop.

Other objects, novel features and advantages of this invention will be apparent from the following specification and accompanying drawing, wherein:

Fig. 1 is a view in elevation of a flashlight equipped with a suspension loop embodying the invention;

Fig. 2 is an end view;

Fig. 3 is a section on the line 3—3 of Fig. 2;

Fig. 4 is a section on the line 4—4 of Fig. 2, and

Fig. 5 is an enlarged section of the connection between the suspension loop and the rotating stud.

The tubular casing 10 of the flashlight is provided with a base cap 11 which screws on to the end of the casing. In the end of the base cap there is provided a recess or socket 12 comprising a generally semi-circular portion from the base of which extends a channel. In the channel there is provided a hollow stud 13, the inner end of which is rotatably connected to the base cap. A wire loop 14 of proper configuration to be loosely received in the semi-circular portion of the recess 12 is provided with legs 15 having inturned ends projecting into the stud 13, the loop being thereby pivotally connected to the stud. The legs 15 converge slightly toward the stud 13 and are held snugly against the stud by the resiliency of the loop 14, the loop 14 being made of resilient wire and so designed that the inner ends of the legs 15 are constantly subjected to pressure tending to force them toward each other.

The loop 14 is provided with a central offset portion 16 which projects through a cut-out leading from the recess 12, the portion 16 thus providing means by which the loop may be lifted from the position shown in full lines in Fig. 3 to the position shown in dotted lines in the same figure.

As shown in Fig. 5, the stud 13 is provided with slight shoulders 17 overhanging the inner ends of the legs 15. These shoulders provide means tending to retain the loop 14 in its recess 12. As the loop is lifted, engagement of the legs 15 with the shoulders 17 causes the legs to move apart against the force tending to move them toward each other. The friction thus produced opposes lifting movement of the loop and tends to hold the loop in inoperative position in the recess.

After the loop has been raised to the position shown in dotted lines in Fig. 3, it may be rotated as desired about the axis of the stud 13. Thus, the loop may be arranged in any one of a large number of positions and is not confined to the single position. The rotatability of the loop about the axis of the stud 13 adds materially to the convenience of its use.

It is of course understood that various modifications may be made in the device above described, without in any way departing from the spirit of the invention as defined in the appended claims.

I claim:

1. In a flashlight, a casing, a depression in one end face of said casing, said depression having a substantially semi-circular portion with a channel portion leading therefrom and a cut-out opposite said channel portion, a stud rotatably attached to said casing and being arranged in said channel portion, and a loop having a substantially semi-circular portion terminating in a pair of legs pivotally connected at their ends to said stud and a central offset portion receivable in said cut-out.

2. In a flashlight, a casing, a depression in one end face of said casing, said depression having a substantially semi-circular portion with a channel portion leading therefrom and a cut-out opposite said channel portion, a stud rotatably attached to said casing and being arranged in said channel portion, and a resilient loop having a substantially semi-circular portion terminating in a pair of legs pivotally connected at their ends to said stud and a central offset portion receivable in said cut-out, and shoulders on said stud overhanging the inner ends of said legs and tending to force the same apart upon lifting the suspension loop from inoperative to operative position.

ANTHONY J. DESIMONE.